Oct. 29, 1963     H. T. KRAFT     3,108,628
PNEUMATIC TIRE

Filed March 13, 1959     3 Sheets-Sheet 1

INVENTOR
Herman T. Kraft
BY McCoy, Greene & te Grotenhuis
ATTORNEYS

Oct. 29, 1963     H. T. KRAFT     3,108,628
PNEUMATIC TIRE

Filed March 13, 1959     3 Sheets-Sheet 2

INVENTOR
*Herman T. Kraft*

BY *McCoy, Greene & Te Grotenhuis*
ATTORNEYS

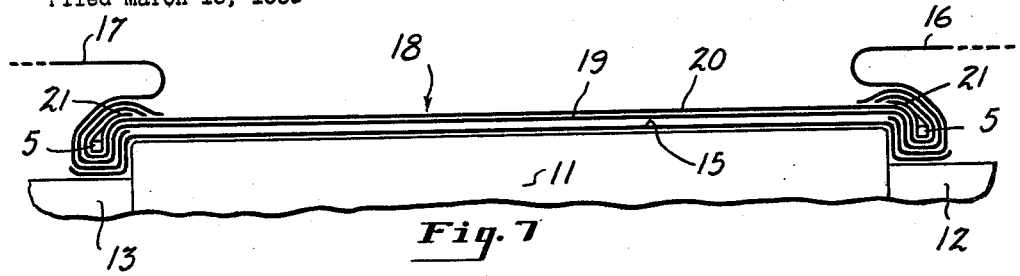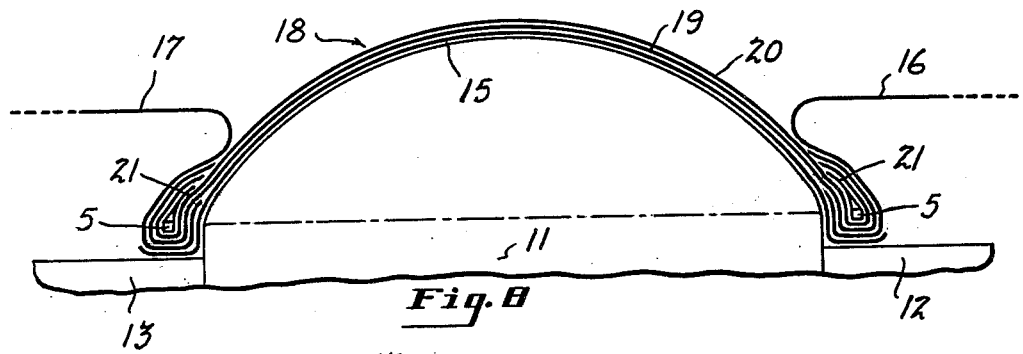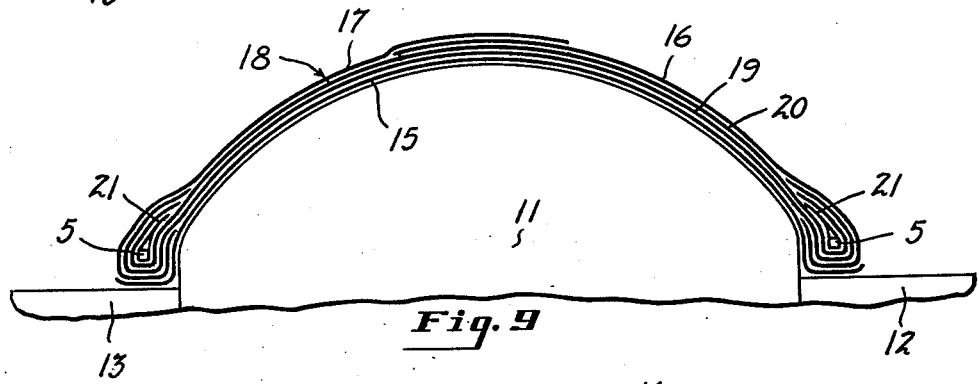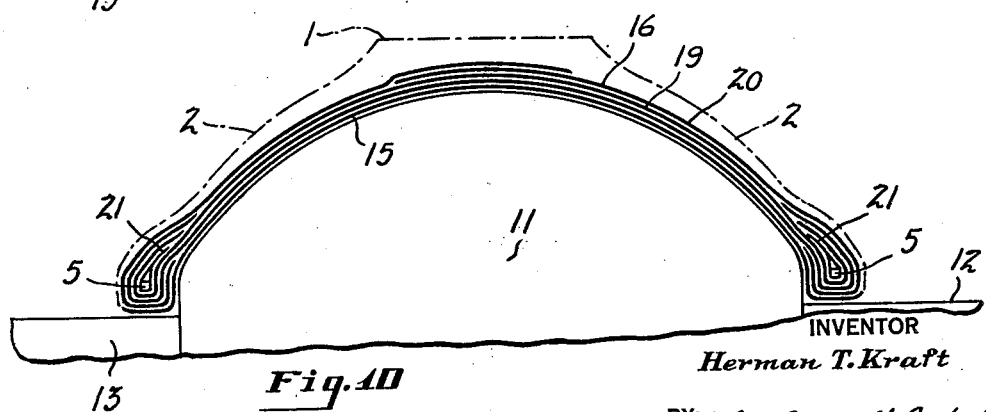

United States Patent Office 3,108,628
Patented Oct. 29, 1963

3,108,628
PNEUMATIC TIRE
Herman T. Kraft, Akron, Ohio, assignor to The General Tire & Rubber Company, Akron, Ohio, a corporation of Ohio
Filed Mar. 13, 1959, Ser. No. 799,173
4 Claims. (Cl. 152—354)

This invention relates to pneumatic tires of the type in which the main reinforcement is provided by cords extending substantially perpendicular to the center plane of the tire and in which additional reinforcement is provided to impart stability to the tire.

Strips of cord fabric of the proper width and length to form the reinforcing plies of a tire are cut from a continuous rubber coated strip in which the cords extend longitudinally and since the longitudinal edges of the ply are generally at an angle to the cords, the ply strips are generally referred to as "bias cut" fabric. Where the cords are at right angles to the longitudinal edges of the strip they are disposed in the tire casing perpendicularly to the median plane of the tire in which the center line of the tire crown lies and may be referred to as "radial" cords. The angle of the cords to a plane in which the axis of the tire lies perpendicular to the median plane of the tire is referred to as the "bias angle" of the cords, cords parallel to the median plane of the tire and to the edges of the ply strip having a 90° bias angle and cords perpendicular to said plane and to the strip edges having a 0° bias angle.

It has been found that tires with radial cords only have adequate strength, great flexibility and superior cushioning action, but that such tires lack the stability necessary for the proper steering of an automobile because of the fact that change, in the form of a tire due to lateral deflection have little or no tendency to elongate the radial cords and such cords, therefore, do not provide adequate resistance to lateral thrusts. It has been proposed to provide the necessary lateral rigidity by means of a relatively stiff and inextensible reinforcing band in the tread portion of the tire, but such reinforcement greatly reduces the flexibility and elastic cushioning action of the tire.

The tire of the present invention employs radial cords as the main reinforcing elements and has stabilizing reinforcement in the form of an exterior layer of bias cut cord fabric. The exterior layer consists of two bias cut cord fabric strips narrower than the radial cord band, one of the cord fabric strips extending from each tire bead and over the major portion of the width of the tread portion of the tire, thereby providing an overlap in the tread portion of the tire that extends across the major portion of the width of the tire tread. The cords of the two fabric strips have opposite angularity and are disposed in crossing relation in the overlap.

Because of the fact that the axial length of a cord fabric band that can be expanded from cylindrical form to the shape of a tire of a given size varies with the angularity of the cords, it is necessary in building tires by the flat band method to employ cord fabric cut to substantially the same bias angle for all plies of the tire that extend from bead to bead.

In the tire of the present invention excessive tension on the angularly extending cords during expansion of the casing to toroidal form is avoided by providing an outer stabilizing ply composed of two bias cut fabric strips that overlap in the tread portion of the tire so that the tension on the cords is partially relieved during expansion of the casing by the elasticity of the rubber anchoring the ends of the cords that are in the tread portion of the tire.

In building the tire of the present invention a radial cord band and two bias cut cord fabric bands are placed on a substantially cylindrical tire building drum with the inner ends of the bias cut cord fabric bands and the opposite ends of the radial cord band overlapped. Bead rings are then secured in place at the overlapping ends of the bands and the central radial cord band is expanded to transversely arched form while the bead rings are moved closer together. The bias cut fabric bands are then folded, one after the other, over the bead rings and stitched to the exterior of the arched band, providing an overlap centrally of the band in which the cords are disposed in crossing relation. A rubber covering is then applied to complete the tire casing which is then expanded by fluid pressure to toroidal form and vulcanized in the usual conventional manner.

By expanding the radial cord plies to arched form prior to application of the bias cut cord fabric the initial width of the overlap is reduced and the amount of slippage between the crossing cords in the overlap is reduced. The final expansion puts the angularly extending cords of the outer ply under considerable tension and the tension on the angularly disposed cords, together with the circumferential stretch of the tread portion, narrows the overlap by pantographing the crossing cords, thereby materially increasing the angularity of the cords in the two layers of the overlap. This results in disposing the cords in the overlap at a considerably higher bias angle than the cords in the side walls. Deflection of the tire under lateral thrusts is resisted by the diagonal cords in the side walls which because of their angularity would be elongated by lateral deformations which would be permitted by the radial reinforcement in the absence of such diagonal cords. The effectiveness of the angular stabilizing cords is increased by reason of the fact that the overlap in the tread portion provides an elastic anchor for the cords, imparting elasticity to the side walls so that stabilization is effected with a minimum loss of the easy riding characteristics afforded by the radial reinforcement. The overlap forms a stretch resisting band that provides the desirable resistance to circumferential stretch without greatly lessening the elasticity of the tread portion of the tire.

Reference should be had to the accompanying drawings forming part of this specification, in which:

FIGS. 4 to 10 show successive steps employed in the building of the tire;

FIG. 4 shows the radial cord band and the bias cut fabric bands placed on a cylindrical drum with their ends overlapping;

FIG. 5 shows the central portion of the drum within the radial cord band expanded to provide shoulders against which bead rings may be placed;

FIG. 6 shows bead rings applied to the overlapping end portions of the bands that overlie the shoulders at the ends of the expanded portion of the drum;

FIG. 7 shows the portions of the fabric bands adjacent the bead rings folded inwardly over the bead rings;

FIG. 8 shows the radial cord band expanded to transversely arched form;

FIG. 9 shows the bias cut fabric bands laid upon the exterior of the arched band with edge portions thereof forming the overlap at the center of the band; and FIG. 10 shows a rubber tread and side wall covering applied to the fabric carcass preparatory to expanding the casing to its final toroidal form and vulcanizing.

Figure 1:
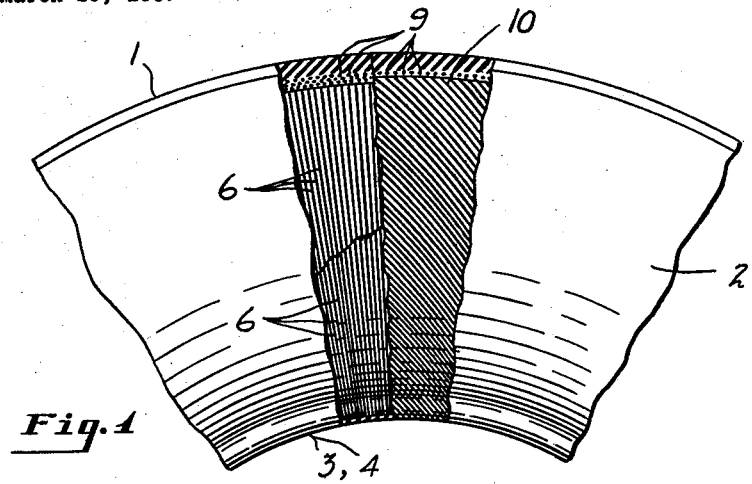
FIGURE 1 is a fragmentary side elevation of a tire involving the invention with portions broken away to show the arrangement of the reinforcing cords in a side wall of the tire.
Figure 2:
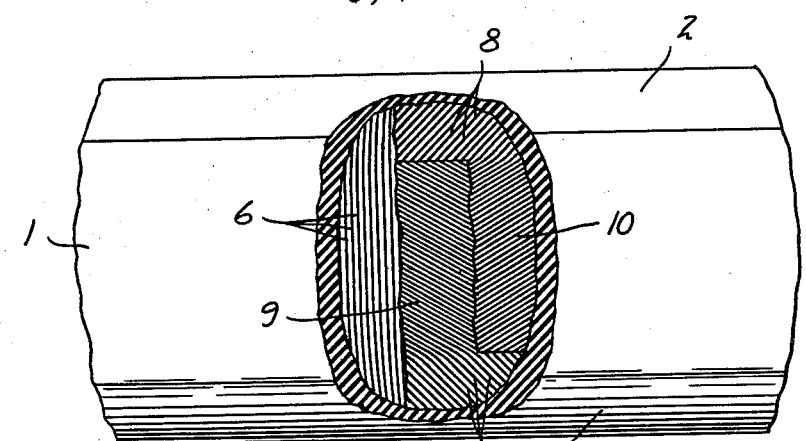
FIG. 2 is a fragmentary plan view of the tread portion of the tire with portions broken away to show the arrangement of reinforcing cords in the tread portion of the tire.
Figure 3:
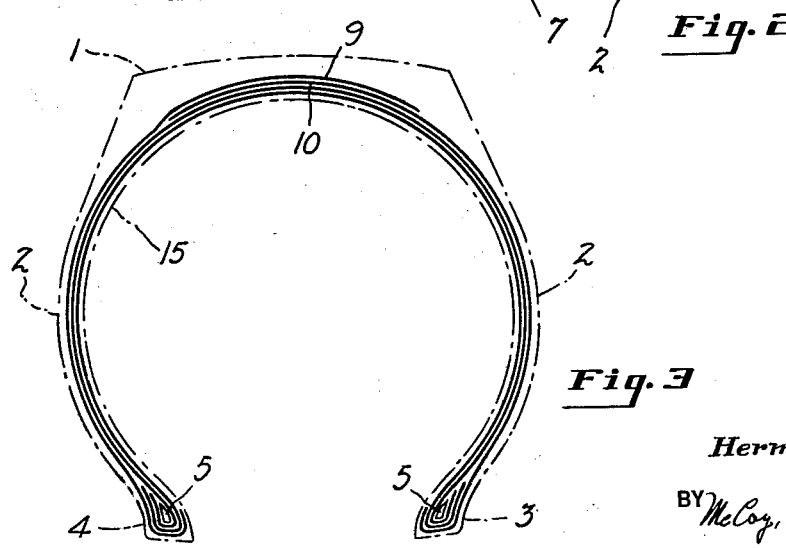
FIG. 3 is a transverse section through the tire.

As shown in FIGS. 1, 2 and 3 of the drawings, the tire of the present invention is of conventional cross sectional shape, having a tread 1, side walls 2 and base beads 3 and 4. Each of the beads 3 and 4 has an inextensible bead ring 5 therein. The tire has radial reinforcing cords 6 that extend from the bead 3 and the bead 4 and that have their opposite ends anchored in the beads 3 and 4. Outer stabilizing cords 7 are anchored at one end in the bead 3 and extend diagonally from the bead 3 to the tread portion of the tire and across the major portion of the width of said tread. Stabilizing cords 8 are anchored at one end in the bead 4, extend from the beads at an angle opposite that of the cords 7 and overlap the cords 7 in crossing relation across the major portion of the width of the tread. The stabilizing cords 7 and 8 have portions 9 and 10 in the overlap that are disposed at a bias angle considerably greater than the portions of the cords in the side walls of the tire.

Figure 4:
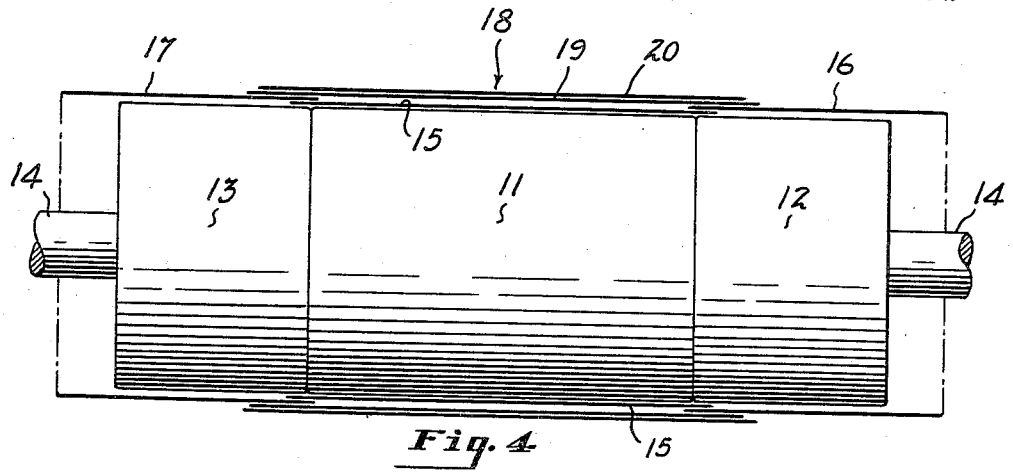
Figure 5:
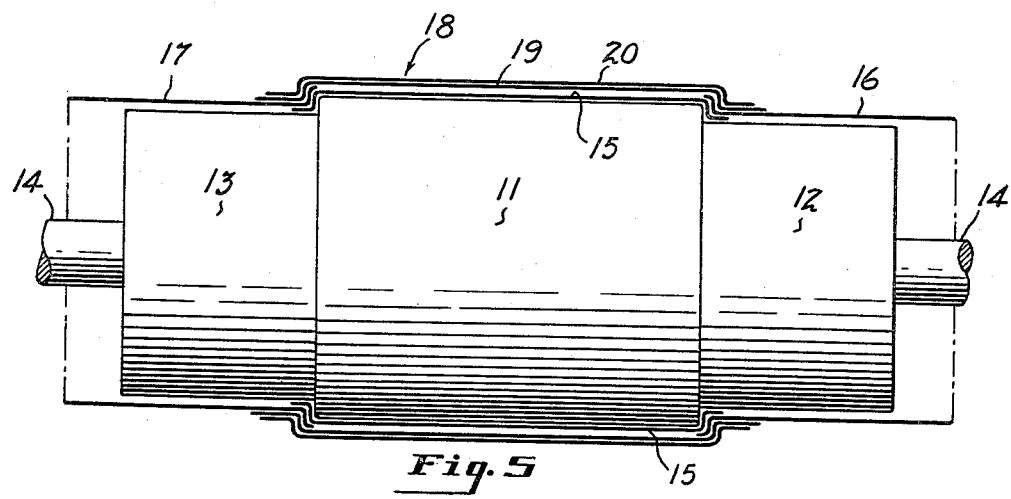
Figure 6:
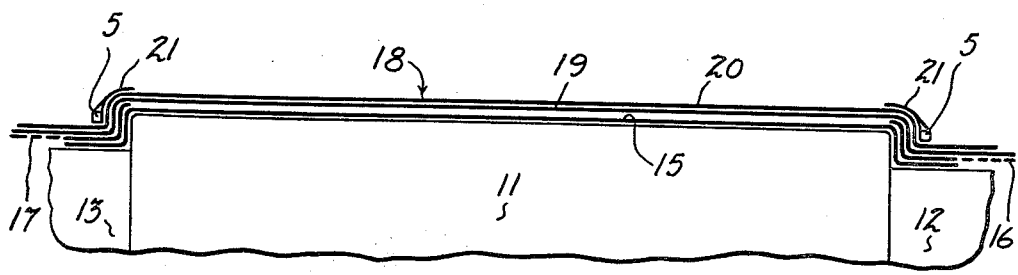

As shown in FIGS. 4, 5 and 6, a tire building drum having a central expansible section 11 and end sections 12 and 13, which are supported in the usual manner on a shaft 14, is employed in the building of the tire of the present invention. As shown in FIG. 4 a layer of rubber 15 is banded on the central portion 11 of the drum, bands 16 and 17 of bias cut cord fabric are then laid upon the end portions 12 and 13 with their inner ends overlapping the rubber band 15, after which a radial cord band 18 which may be composed of inner and outer plies 19 and 20 of radial cord fabric is laid upon the central section 11 of the drum with its ends overlapping the inner ends of the bands 16 and 17. With the bands placed upon the drum as illustrated in FIG. 4 of the drawings, the central section 11 of the drum is expanded as shown in FIG. 5 to provide shoulders at its ends for positioning the bead rings 5 which are of a diameter to pass axially over the bands 16 and 17 as shown in FIG. 6. The overlapping portions of the bands 15, 16, 17 and 18 are pressed against the shoulders of the section 11 of the drum by suitable bead seating devices which press the rings 5 against the shoulders and stitch the flipper strips 21 carried by the bead rings 5 to the band 18. Portions of the bands within and adjacent the outer sides of the rings 5 are then folded outwardly over the bead rings 5 as shown in FIG. 7 of the drawings.

The partially built tire is then expanded by internally applied fluid pressure while the bead portions thereof are moved closer together to expand the radial cord band 18 to transversely arched form as shown in FIG. 8. The bias cord fabric bands 16 and 17 are then folded inwardly and stitched against the exterior surface of the arched band 18. The application of the bands 16 and 17 to the exterior of the band 18 is performed in successive operations so that the two bands overlap centrally of the tire casing. As shown, the inner end of the band 16 underlies the inner end of the band 17.

After the bands 16 and 17 are stitched down the rubber covering stock forming the tread 1 and the covering for the side walls 2 is applied to the casing and the casing is then expanded to its final form shown in FIG. 3 of the drawings. By expanding the band 18 to arched form before applying the bias cut cord fabric bands 16 and 17 to its exterior surface the width of the initial overlap formed by the bands 16 and 17 is reduced so that the tire may be expanded to its final form without subjecting the cords of the bands 16 and 17 to excessive tension.

During expansion of the casing from the form shown in FIG. 10 to that shown in FIG. 3, practically all of the resistance to expansion is provided by the cords 7 and 8 of the bands 16 and 17. The expansion of the free ends of the bands 16 and 17 necessary to stitch them to the arched band 18 causes the cord spacing of the portions thereof which overlap to be increased and also causes an increase in the bias angles of the crossing cords in the overlap portion when the bands 16 and 17 are stitched down as shown in FIG. 9. Further expansion of the casing causes a further increase in the spacing and bias angle of the overlapping portions 9 and 10 of the cords and since all of the diagonally extending cords in the bands 16 and 17 are under considerable tension due to their angularity, the free ends of the portions 9 and 10 of the cords 7 and 8 are drawn toward the center plane of the tire, narrowing the overlap and further increasing the bias angle of the cords 9 and 10.

All reinforcing cords may be of textile cords or metallic cords but it is preferred that the bias cords be textile cords. Nylon cord fabric is preferred for the outer stabilizing layer.

The amount of initial expansion of the radial cord plies prior to the stitching of the bias cut fabric thereto may be from one-third to two-thirds the radial height of the finished casing, the amount of initial expansion desirable being dependent upon the elasticity and tensile strength of the bias cords, more initial expansion being desirable for cords of low elasticity or low tensile strength.

The radial reinforcing cords 6 need not be disposed exactly perpendicular to the median plane of the tire; they may initially be disposed at a small angle up to about 10° to the perpendicular without materially affecting their reinforcing action. The bias angle of the cords of the strips 16 and 17 may be initially from 35° to 50° and when a tire casing is expanded to final form, the portions 9 and 10 of these cords will have a bias angle of 60° to 75°, thus providing an effective expansion restraining reinforcement in the tread portion of the tire. The reinforcing band formed by the overlap of the bands 16 and 17 not only provides an elastic reinforcing band for the tread portion of the tire, but also provides an elastic anchor for the stabilizing cords 7 and 8 which are subjected to increased tension by lateral deformations of the tire caused by lateral thrusts on the ground engaging portion thereof. Such deformations cause little variation in the tire perimeter measured in a radial plane, but the cords 7 and 8 being disposed diagonally, are subjected to increased tension because of the fact that such lateral deformations materially increase the perimeter of the tire measured in the angular direction of an individual cord 7 or 8.

The overlapping cords 9 and 10 provide an elastic anchor for the ends of the cords 7 and 8, so that lateral deformations of the tire due to lateral thrust are effectively cushioned and stability is obtained without sacrificing easy riding qualities of a radially reinforced tire.

It is to be understood that in accordance with the provisions of the patent statutes, variations and modifications of the specific devices herein shown and described may be made without departing from the spirit of the invention.

What I claim is:

1. A pneumatic tire comprising an annular body of rubber-like material having a central tread portion, edge beads and side walls connecting the tread and beads, said body having an inner reinforcing ply and an outer stabilizing ply, said inner ply having closely spaced cords extending from bead to bead approximately perpendicular to the median plane of the tire and anchored at their ends in said beads, said outer ply comprising two strips of bias cut cord fabric of substantially equal width, each narrower than said inner ply, one of said strips having an edge portion anchored in one of said beads, the other of said strips having an edge portion anchored in the other of said beads, the opposite edges of said strips lying in the tread portion with an overlap across the major portion of the width of said tread portion, the stabilizing cords of said strips having opposite angularity with respect to the median plane of the tire and being disposed in crossing relation in said overlap, the bias angle of the stabilizing cords in the overlap being at least 10° greater than in the side walls of the tire.

2. A pneumatic tire according to claim 1 in which the bias angle of stabilizing plies is from 40° to 50° adjacent the beads and from 60° to 75° in the overlap.

3. A pneumatic tire according to claim 1 in which the radial cords are metallic and the stabilizing cords are of textile material.

4. A pneumatic tire according to claim 1 in which both the radial and angular cords are metallic.

References Cited in the file of this patent

UNITED STATES PATENTS

| | | |
|---|---|---|
| 1,554,370 | Renner | Sept. 22, 1925 |
| 1,732,793 | Darrow | Oct. 22, 1929 |
| 1,818,944 | Darrow | Aug. 11, 1931 |
| 2,310,776 | Gay | Feb. 9, 1943 |
| 2,700,998 | Wallace | Feb. 1, 1955 |
| 2,703,128 | Darrow | Mar. 1, 1955 |
| 2,703,132 | Darrow | Mar. 1, 1955 |
| 2,811,191 | Comstock | Oct. 29, 1957 |
| 2,939,503 | Frohlich et al. | June 7, 1960 |

FOREIGN PATENTS

| | | |
|---|---|---|
| 649,819 | Great Britain | June 31, 1951 |
| 808,341 | Great Britain | Feb. 4, 1959 |
| 1,088,973 | France | Sept. 22, 1954 |